Dec. 18, 1956  G. SLAYTER  2,774,443
FILTER
Filed June 23, 1953  4 Sheets-Sheet 2

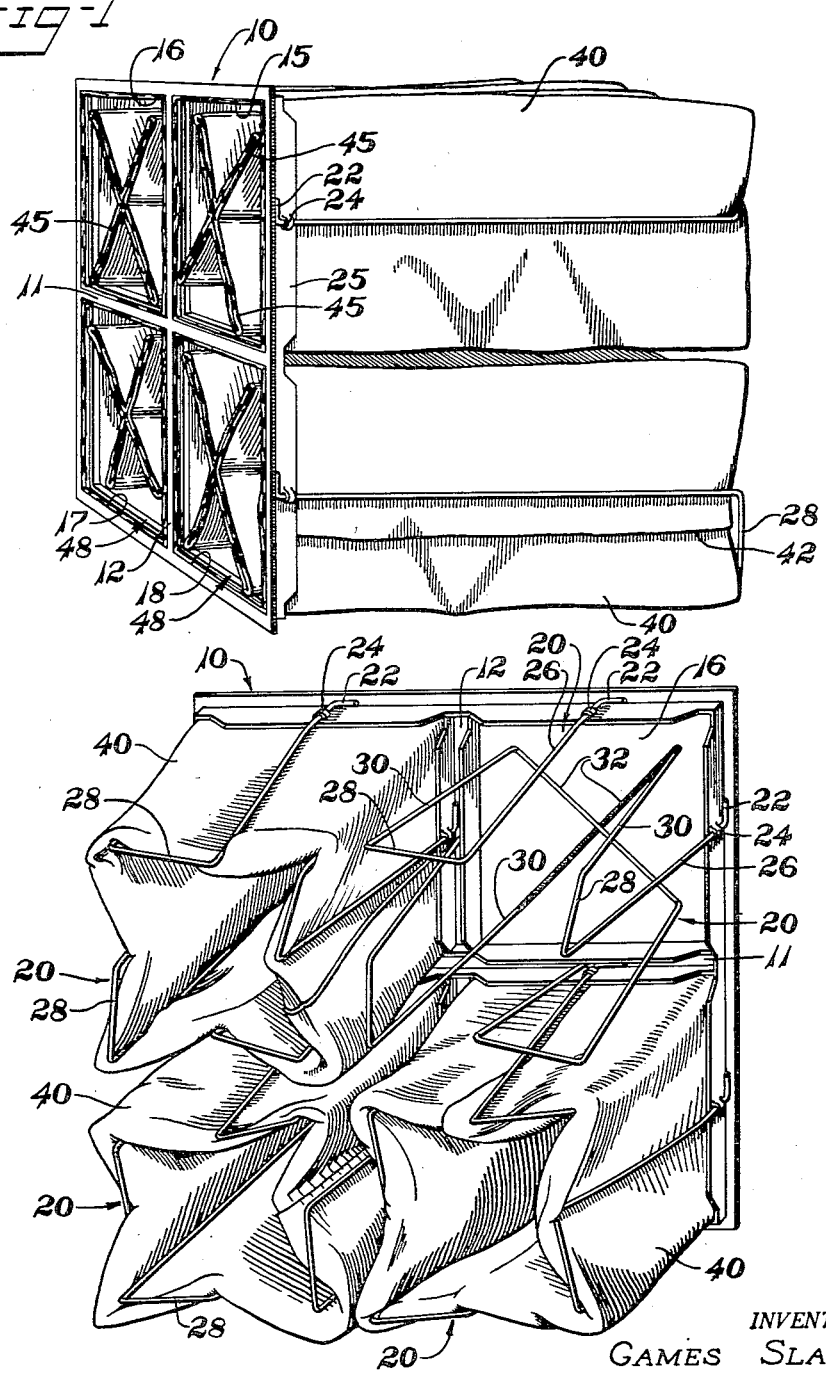

INVENTOR.
GAMES SLAYTER
BY
*Hachin & Overman*
ATTYS.

Dec. 18, 1956 — G. SLAYTER — 2,774,443
FILTER
Filed June 23, 1953 — 4 Sheets-Sheet 3

INVENTOR.
GAMES SLAYTER
BY
ATTYS.

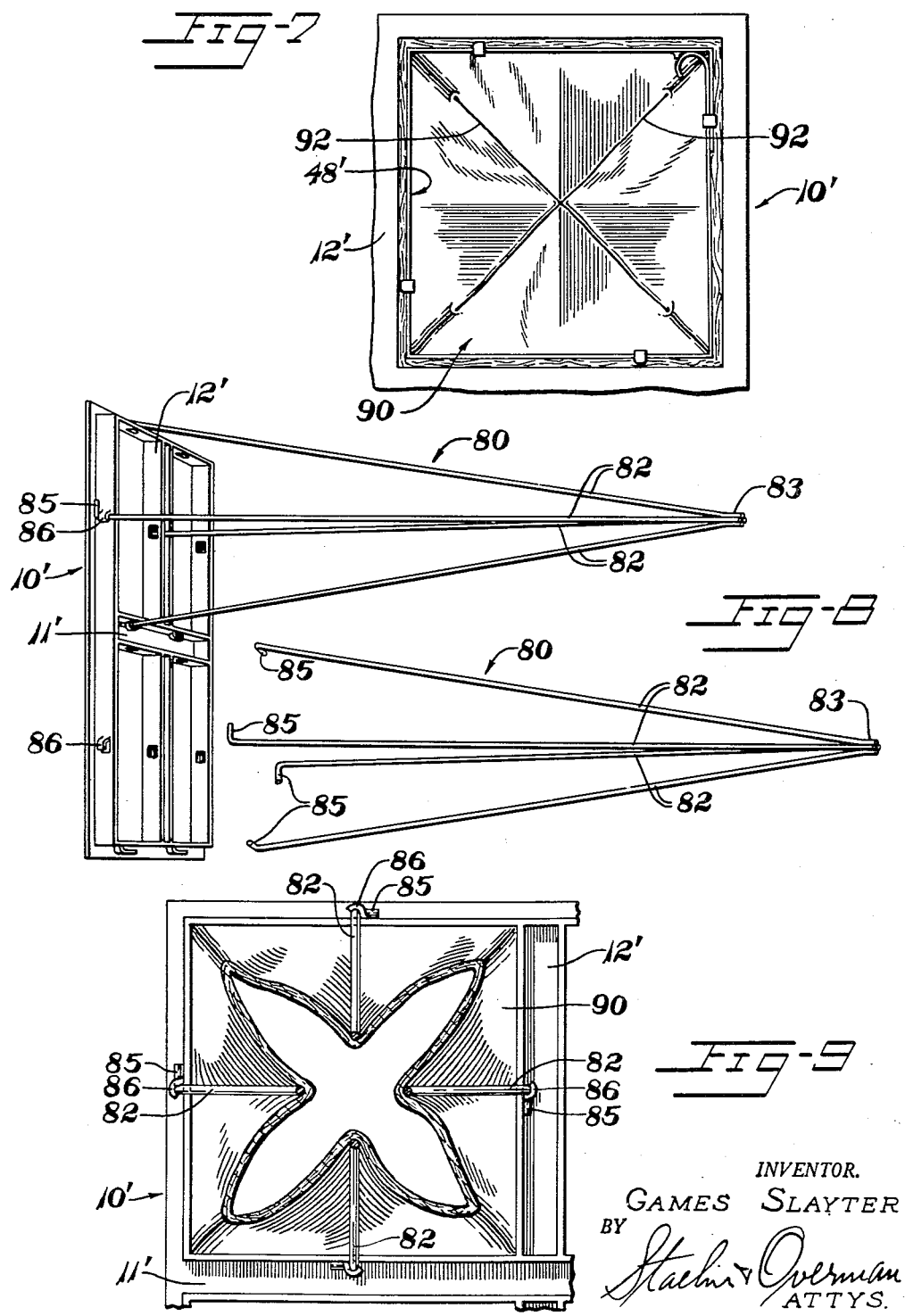

United States Patent Office 2,774,443
Patented Dec. 18, 1956

2,774,443

FILTER

Games Slayter, Newark, Ohio, assignor to Owens-Corning Fiberglas Corporation, a corporation of Delaware Application June 23, 1953, Serial No. 363,510

5 Claims. (Cl. 183—51)

This invention relates to filters or dust separators and more especially to improvements in filters of the strainer type particularly adapted for separating dust and foreign particles from an air or gas stream. It has been conventional practice to employ mats of mineral fibers such as relatively coarse glass fibers disposed in the path of an air stream for the purposes of filtering out or separating dust or other foreign particles entrained in the air. Mats of this character are used in home and industrial air-circulating systems in which blowers or other air-moving means are usually employed to develop air pressure sufficient to circulate air through the filter means.

Filter mats of this character are of flat rectangular shape and the effective filter area thereof presented to the air stream is necessarily limited to the uniplanar surface of rectangular shape. Such mats are several inches in thickness and present comparatively high resistance to the flow of air or gases, a factor which is increased as the filter media fills up with foreign particles. In order to secure satisfactory flow of air through the filter media of conventional type without impairing filter efficiency, it would be necessary to increase the area of the mat media many times the area of the filter cell inlet opening. If filter media area is insufficient, the filter unit or separator will have a high initial resistance to air flow, high static pressure of the fan or blower will be encountered and the flow of air at required volume cannot be maintained because of the deposition of dust and foreign matter in the interstices of the filter which unduly shortens the life of the unit.

Efforts have been made to increase the effective filtering area of the filter cell by folding and contorting a mat, but such arrangements require special mountings to support the mat to satisfactorily resist the air pressure. Such arrangements necessarily modify the direction of air flow, setting up additional resistance to passage of air, and air flow at desired volume cannot be maintained.

An object of the present invention is the provision of a strainer-type filter unit or cell of a bag-like form or shape in which the media is formed of very fine mineral fibers.

An object of the invention resides in a strainer-type means for separating foreign particles from air or other gas streams utilizing a filter media of comparatively fine mineral fibers oriented into a formation adapted to attain comparatively high efficiency as a strainer yet presenting comparatively low initial flow resistance.

Another object of the invention resides in the provision of a separator or filter formed of comparatively fine mineral fibers oriented into a formation having high efficiency as a strainer or particle removing means and which is adapted to occupy comparatively small space and at the same time provide a relatively large filter area or media.

Another object of the invention is the provision of a bag-type filter formed of comparatively fine glass fibers matted or felted together in a manner presenting a filter media of an area presenting a comparatively low initial resistance to the passage of gases but which is adaptable for screening out extremely fine particles entrained in the gas stream passing through the filter without materially impairing or unduly shortening the life of the filter.

Another object of the invention resides in a strainer-type filter mat formed of very fine fibers which is of comparatively low density and which is adaptable for screening or filtering foreign particles from an air or other gas stream regardless of composition of the particles or their radioactive characteristics.

A further object of the invention resides in a strainer-type filter formed of very fine glass fibers oriented into mat formation which is of a shape rendering it readily adaptable for use with a primary or prefilter unit, the latter being of a character suitable for removing coarse particles from an air or gas stream.

A further object of the invention resides in the provision of a filter cell of the bag type fashioned and supported in a manner whereby the same may be advantageously disposed in vertical, horizontal or angular positions without impairing the screening or particle removing efficiency of the cell.

Another object of the invention resides in a method of configurating a filter media to occupy a comparatively small space yet maintaining an adequate surface area, the invention involving an effective method and means for securing the filter media to conventional filter mountings in a manner facilitating installation and removal of the filter media in a minimum of time.

Another object is the provision of a bag form of filter media mounted in a manner whereby an inexpensive lightweight supporting means may be employed to prevent collapsing of the bag, the filter media being shaped to effectively resist distortion under pressure of the stream of air or gas passing therethrough.

Further objects and advantages are within the scope of this invention such as relate to the arrangement operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational perspective view illustrating a form of filter unit of the invention embodying four filter cells;

Figure 2 is an end perspective view showing the arrangement of filter bags or cells in the unit shown in Figure 1, one of the bags being removed for purposes of illustration;

Figure 7 is a fragmentary top plan view showing one of the filter cells of the arrangement illustrated in Figure 6;

Figure 8 is a view illustrating a form of frame supporting one of the filter cells of Figure 6 and showing a second filter support disassembled from a base frame, and Figure 9 is a transverse sectional view taken substantially on the line 9—9 of Figure 6.

Figure 3:
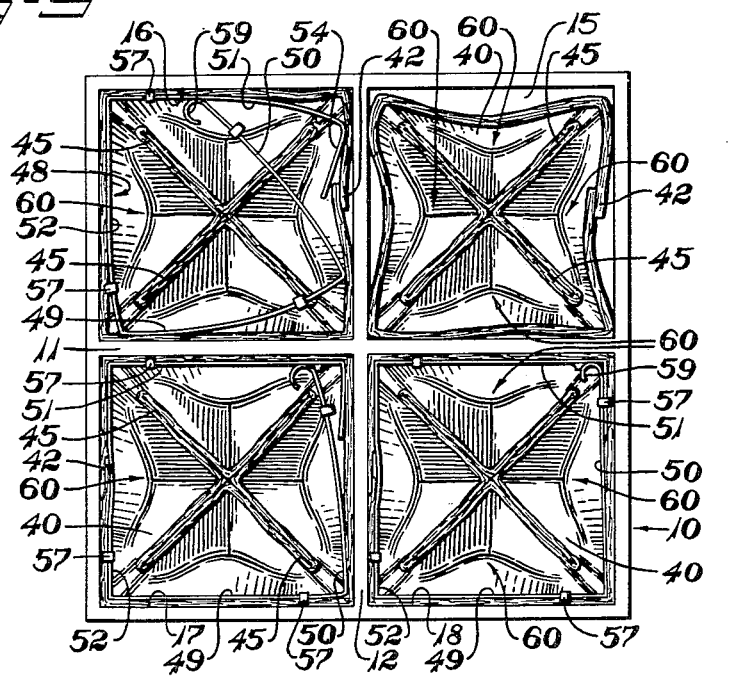
Figure 3 is a top plan view of the filter arrangement illustrating steps in the method of affixing or applying a securing means for retaining the filter media in a supporting frame.

The forms of the filter construction illustrated are of a dimension and shape rendering them adaptable for installation in or assembly with a rectangular frame of the general type heretofore employed in supporting substantially rigid or self-supporting impact-type filter constructions formed of comparatively coarse glass fibers assembled in a uniplanar mat formation. It is to be understood, however, that the bag-type filter cells may be of various shapes and dimensions, depending upon the character of installation, the volume of air or gas to be passed through the filter cell and the nature of the foreign matter to be separated or strained from an air or gas stream.

Referring to the drawings in detail and first with reference to the form of arrangement disclosed in Figures 1 through 5, inclusive, there is shown a filter assembly formed of four cells or units disposed in contiguous relation. The filter cells are associated with and are mounted upon a supporting structure including a frame or member 10 of rectangular cross section, the frame including cross members 11 and 12, preferably of channel shape, subdividing the area bounded by frame member 10 to present a plurality of substantially square openings or filter entrances identified by numerals 15, 16, 17 and 18.

Figure 4:
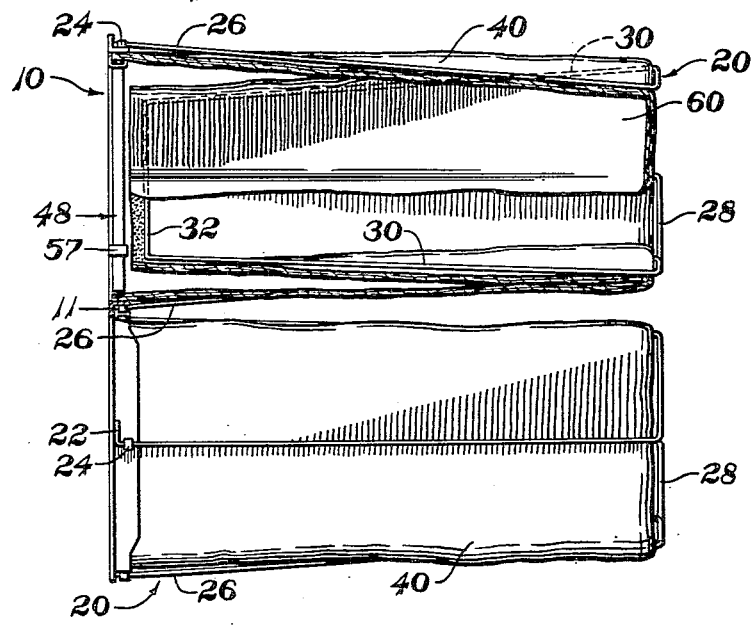
Figure 4 is a side view partially in section of the construction shown in Figure 1.

In the embodiment shown in Figures 1 through 5, each filter mat or media is maintained in proper position by a supplemental frame component or construction provided by two rods or wires fashioned to the required shape or configuration. For purposes of illustration one of the filter bags or mats is omitted from Figure 2 to portray the shape of the supplemental wire frame. Extending from the sheet metal frame member 10 are rods or wires 20, each rod having its upper extremities bent at right angles to the major portion of the rod forming transversely extending portions 22 which are adapted to be secured to member 10 by means of tabs or fingers formed out of flanges 25 of member 10 and cross members 11. Each tab or finger is formed as a struck up portion and a rod 20 is secured in place by disposing the bent extremities 22 thereof beneath opposed tabs and distorting the tabs into interlocking engagement with the portions 22. As shown in Figure 4 each of the rods 20 has substantially parallel portions 26 extending to a zone or point adjacent to and exteriorly of the terminus of a filter cell. The portions of the rods adjacent the terminus or closed end of the filter cell are bent at right angles to provide transversely extending portions 28. Portions 30 of the rod are retroflexed toward the entrance of the filter unit and are joined adjacent the entrance by a transversely extending portion 32. Another rod construction of identical shape or configuration is spaced 90° from the first, thus disposing the portions 32 in a right-angular or crossed relation. The filter media or mat 40 of each filter cell is thus maintained in proper position by two of the wire frame constructions or assemblies above described.

Each filter cell or unit 40 is formed of a sheet or mat of very fine fibers formed of glass or other fiber-forming material, such as fusible rock, slag and aluminum silicate, each mat or sheet being lapped as shown at 42 in Figures 1 and 3. Each sheet or mat forming the filter media of a cell lapped as shown at 42 in Figure 3 provides a tubular construction which is assembled with the rectangular frame 10 and the supplemental wire frame in the manner hereinafter described.

Figure 3 illustrates the four-cell construction as shown in Figure 1 and exemplifies the several steps in the method of assembling a bag filter or cell in the frame 10. The first step is to assemble the filter bag supporting wire frames 20 to the rectangular sheet metal frame 10 in the manner illustrated in Figure 2 wherein the wire frames 20, which have been preconfigured or bent to the shape hereinbefore described, are secured by bending the tabs or struck up portions 24 into clamping relation with the end portions 22 of the wire frames. The filter media in the form of the sheet or mat 40 is then inserted through the entrance in the frame 10, and as the mat is moved into position within the wires 20 of the supplemental frame, the lower zone of the mat is retroverted toward the entrance in the frame 10 so that the ends of the mat are disposed adjacent the entrance opening in the sheet metal frame 10. It will be noticed from Figures 1 and 3 that the crossed or intersecting portions 32 of each pair of bag supporting frame wires are disposed adjacent the entrance of the bag, and the inner end zones 45 of the bag are brought into contiguous relation in the manner shown in Figure 3. The contiguous extremities or zones 45 of the bag are cemented, bonded or otherwise secured together adjacent the crossed portions 32 of the wire frames so that the central inner zone of each filter bag or mat is supported by the adjacent pair of wire frames 20. The portions 32 of the wire frames intersect at right angles and serve to maintain the closed end of the bag filter in a Greek cross shape as shown in Figure 3.

In some instances it may be desirable to preconfigurate the filter mat to its ultimate shape before assembly in the supporting frame. In this method of assembly, substantially one half of the mat is retroverted interiorly of the remaining portion, the end zones of the retroverted section brought into contiguous relation to form the cross-like shape shown in Figure 3 and the contacting end portions of the filter mat bonded or secured together to close this end of the filter bag. The preconfigurated filter mat may then be inserted in the supporting frame and the outer wall of the unit secured to the frame member 10 in the manner now to be described.

The terminus of the portion of the mat or filter media forming the outside of the bag is held in place by novel retaining means in a manner whereby the said means may be quickly applied or disassembled to facilitate installation and removal of the bags.

With particular reference to Figure 3 in which are shown filter units or cells disposed in the frame 10, the method of applying the securing means to the filter units in the frame is illustrated in successive and progressive steps or operations of assembly. The filter unit in the upper right-hand corner of the frame 10 is illustrative of the filter bag or mat in its initial position in the frame before a securing means is applied. Securing means individual to each filter unit is provided and, as illustrated in Figure 3, comprises a band 48 of flexible sheet metal formed or tensioned during manufacture to provide a substantially square form presenting portions 49, 50, 51 and 52, each of a length to snugly clamp the upper edge zone of the filter mat 40 to the adjacent wall of a substantially square opening in the frame 10 in which a unit is disposed. One end of the band 48 is formed with a portion 54 which in assembly is disposed in contiguous relation with the portion 50 as shown in the completed installation with the filter unit shown in the lower right-hand zone of the frame 10 in Figure 3. Each of the portions 49, 50, 51 and 52 is provided with an L-shaped clip or lug 57 which projects outwardly, the lugs 57 being adapted to extend into engaging relation with the frame 10 and cross members thereof to properly position the clamping band 48 in bag holding position and prevent displacement of the band.

The first step in assembling the bag clamping means with a filter unit is illustrated in the upper lefthand unit of Figure 3. The portions 51 and 52 of the clamping means are first brought into substantial coincidence with the adjacent inner walls of the filter bag or unit. Pressure is then exerted against the hook portion 59 at the end of the portion 50 in a direction causing the portion 49 to be brought into contiguous engagement with the third wall of the filter bag as shown in the lower lefthand filter unit of Figure 3. The assembly of the clamping means or band 48 is completed by exerting further pressure upon the hook portion 59 causing the fourth portion or wall 50 of the clamping means to be brought into contiguous engagement with the fourth side of the filter unit and into contact with the portion 54 of the clamping means 48.

The clamping means is illustrated in fully assembled bag clamping position with the lower filter unit at the right in Figure 3. In assembled position the lugs 57 extend outwardly in engagement with portions of the sheet metal frame 10 and cross members thus preventing displacement of the clamping means longitudinally of the filter units. After the assembly of the filter unit with the supporting structure is completed, the clamping means securely holds the walls of the filter mat in a rectangular open position to provide an entrance for the reception of an air or gas stream to be moved through the filter unit. The filter mat or bag is compressed between the clamping means and the frame to provide a dust-tight seal and the frictional engagement of the bag with the frame prevents relative slippage or displacement of the bag when the latter is distended by air pressure.

The cross-like configuration 45 of the closed zones of the filter mat illustrated in Figure 3 provide a plurality of elongated chambers or pockets 60 of substantially triangular cross section presenting a comparatively large area of filter surface in a minimum space. Furthermore, the frame 10 and supplemental wire frames 20, in cooperation with the bag clamping means, provide adequate support for the filter cells or units in any position of use. For example, they may be disposed in a horizontal position as viewed in Figures 1 and 2 or they may be disposed in a vertical or other position without impairing the filter efficiency as the character of support for the filter media prevents collapse irrespective of the position of use of the units.

Figure 5:
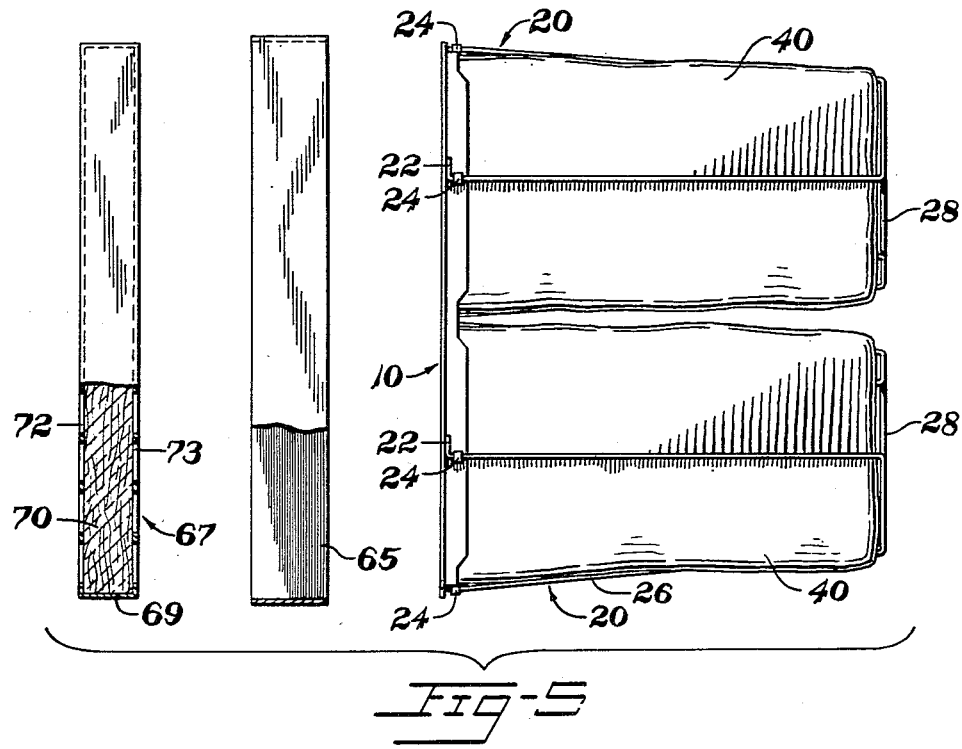
Figure 5 is an expanded view illustrating the method of using a prefilter in conjunction with the filter construction of the invention.

The size and shape of the sheet metal frame 10 may be of conventional character with which flat bonded mats of mineral or vegetable fiber have heretofore been used so that replacements thereof by the filter units of the present invention may be readily effected or the bag filter units used in conjunction with the flat mat filters. Figure 5 is illustrative of the use of the filter units of the present invention with the conventional flat fiber mat of the so-called impinging-type filter formed of comparatively coarse glass fibers treated with tricresyl phosphate or other suitable composition. As shown in Figure 5, a substantially rectangular frame 65 is adapted to be positioned adjacent and secured to the frame 10, the frame 65 being of a dimension to snugly yet slidably accommodate the flat filter mat 67.

The impinging-type filter includes a rectangular frame portion 69 formed of cardboard or thick paper bounding an area in which coarse fibers 70 are disposed in haphazard relation. The fibers 70 are retained by means of thin metal members 72 and 73 which are perforated with a large number of openings to facilitate movement of air or other gas therethrough. The frame 10 and bag-type filter units 40 are shown spaced from the supplemental frame 65 and the flat filter 67. These components in assembled relation provide for initially passing the air or other gas to be filtered through the impinging-type filter 67 and thence into the bag-type filter units 40 of the present invention. This arrangement may be used where it is desired to obtain an especially high filter efficiency. With this arrangement, the larger foreign particles entrained in the air stream will be intercepted and lodged in the fibrous mass 70 of the filter 67 and the finer particles will be intercepted and strained from the air stream by the bag filter units 40.

It will be apparent that by the method of retroverting the inner walls of the filter units 40 within the outside walls of the unit and closing the end portions of the retroverted zones as shown in Figure 3, there is provided a comparatively large filter surface area within a minimum of space. The provision of a large surface area makes possible the utilization of filter bags or units which are comparatively thin-walled as compared with flat filter units 67 of coarse fibers. Thus it has been found that a very efficient filter media may be had utilizing a thin mat or sheet of very fine fibers in which the mat may be of a thickness of from one-quarter inch to an inch. The sizes of fibers utilized in the mats of the bag filter units may be from one-half to eight microns in diameter, and as the fine fibers of the filter mat are arranged in haphazard or interfelted orientation, the density of the filter mat may vary from one-half pound per cubic foot and upwards, depending upon the filtering efficiency desired and the sizes of particles to be filtered from an air or gas stream. Thus a thin mat of compressed fibers may be employed of relatively high density for securing high filtering efficiency with a minimum of static resistance to air flow therethrough.

In the filter assembly illustrated in Figures 1 through 4, the entrance opening of each unit is substantially a square, each side being approximately nine inches in length, the filter bags being about three feet in length.

Figures 6 through 9, inclusive, illustrate a modified form of filter unit. As shown four filter units are contained in one assembly. The filter units are supported upon a frame 10', the frame being provided with longitudinally and transversely extending bars 11' and 12' which divide the rectangular frame into four areas, each area forming an entrance to a filter unit. Secured to the rectangular frame 10' are supplemental wire frame constructions forming supports for the filter mats or mediums. Figure 8 illustrates one of the frame constructions secured to the portion of the frame 10' bounding one of the entrance areas, this figure also showing one of the wire frame constructions in disassembled relation with respect to the frame 10'. As shown in this figure, each filter cell is associated with a skeleton frame 80 formed of a plurality of wires or rods 82 arranged in convergent relation with the ends at the zone of convergence welded together as at 83. The opposite ends of the rods 82 are bent transversely, providing portions 85 which are received by clips 86 formed on the frame 10'. The clips 86 are formed by partially severing metal from the side portions of the rectangular frame 10' and are bent after assembly of the wires or rods 82 therewith into the position shown in the upper portion of Figure 8 so that the rods 82 form a pyramidal shape.

Each of the frames 80 is adapted to support a filter unit or mat 90, which, before assembly, is in the form of a sheet of filter material formed of fine glass fibers lapped upon itself to form a tube. One end of the sheet of fibers is gathered together into a cross-like formation as shown in Figures 7 and 9, and the lapped portions, which are brought together along the seam lines 92 as shown in Figure 7, are secured or bonded toegther by cementitious material or by stitching or other suitable means to close the end zone or portion 95 of the filter unit, the closed end being disposed adjacent the zone of convergence of the frame wires 82. The end of each of the filter mats is secured to the walls or portions of the frame 10' and associated cross members defining the entrance to the filter by means of clamp members 48', as shown in Figure 7, which are of the same character hereinbefore described for securing the mat constructions to the frame member in the manner shown in Figure 3.

Figure 6:
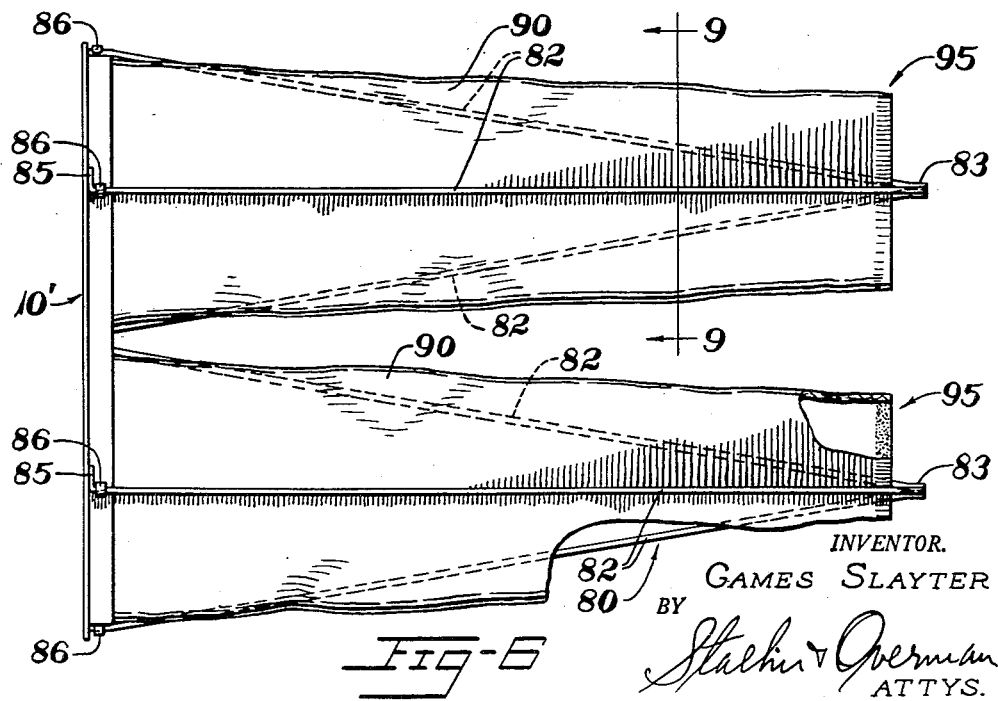
Figure 6 is an elevational view showing another form of filter construction and supporting means of the invention.

The cross-sectional contour of the completed filter cell as shown in Figure 6 varies from a configuration of a cross at the closed end to the substantially square configuration at its open end, a typical cross-sectional view being shown in Figure 9 which is illustrative of the means in which the rods 82 predetermine the shape of the filter sheet or cell from its open end to the closed end.

It should be noted that in the several forms of the invention herein disclosed that the units may be disposed in vertical, horizontal or other position as the skeleton wire frames or supports will maintain the filter mat or medium in an operative position of use in any relative position of the filter unit. It will also be apparent that the shape of the filter mats in the completed units in the several forms of the invention require substantially no support to resist pressure of the air moving through the filter unit. Moreover, the filter units present comparatively large filter area so that the effective and useful life of the filter is greatly prolonged over conventional filters now in use. The particular arrangement of the bag-like shape makes possible the effective use of a filter media of very fine fibers so that an improved filter efficiency is attained without increasing the static resistance of the unit to the passage of air. The use of very fine glass fibers renders the filter of the present invention effective to remove minute foreign particles which heretofore could not be removed by flat filters formed of relatively coarse fibers.

It is apparent that, within the scope of the invention, modifications and different arrangements may be made other than is herein disclosed, and the present disclosure is illustrative merely, the inveniton comprehending all variations thereof.

I claim:

1. Apparatus for separating entrained particles from a gas stream including, in combination, an elongated bag-like unit, said unit being formed of an assemblage of relatively fine interfelted glass fibers, a frame including a rectangularly shaped portion adapted to engage the unit at the open end thereof, said unit having a retroflexed portion forming inner and outer walls of glass fibers, the end of the retroflexed portion being closed and the closed zone disposed adjacent the entrance of the unit, a plurality of rods having end portions secured to the frame, said rods being shaped to engage the unit at spaced zones shaping the unit into a plurality of chambers of substantially triangular cross-section.

2. A filter cell of the strainer type for removing particles entrained in a gas stream including, in combination, a sheet metal frame having a rectangular opening therein, a pair of rods having their ends secured to said frame and the intermediate portions extending therefrom, a tubular filter element formed of a sheet of interfelted mineral fibers, said filter element having a portion retroflexed upon itself, the outer wall of the filter element at its open end being secured in engagement with the portion of the sheet metal frame defining the rectangular opening, said filter element being disposed coextensive with and supported by said rods, the end of the retroflexed portion of the filter element being closed by a plurality of folds, and means for sealing the contiguous wall portions of the folds.

3. A filter construction of the strainer type including, in combination, a frame formed of sheet metal having a substantially rectangular opening formed therein, each side wall of the rectangular opening being formed with an integral struck up portion, a plurality of rods having end portions extending substantially at right angles to the remaining portions of the rods, the portions of the rods adjacent the angular end portions being embraced by the struck up portions on the side walls defining the rectangular opening, a mat of mineral fibers formed into a bag-like shape having an open end, the portions of the mat at the open end extending within and engaging the inner surfaces of the side walls of the rectangular opening, and clamping means extending into the open end of the mat and distortable toward the sides of the frame for securing the open end zone of the mat between the clamping means and the side walls of the rectangular opening.

4. A filter construction of the strainer type including, in combination, a frame formed of sheet metal having a substantially rectangular opening formed therein, each side wall of the rectangular opening being formed with an integral struck up clip portion, a plurality of rods having end portions extending substantially at right angles to the remaining portions of the rods and engaging the side walls defining the rectangular opening in the frame, the portions of the rods adjacent the angular end portions being embraced by the struck up clip portions, a mat of mineral fibers formed into a bag-like shape having an open end, the wall portions of the mat adjacent the open end engaging the side walls of the rectangular opening in the frame, and a single clamping band distortable in directions toward the sides of the rectangular opening for securing the wall portions of the mat defining the open end between the sides of the frame opening and the clamping band.

5. A filter construction of the strainer type including, in combination, a sheet metal frame having a substantially rectangular opening defined by side walls, a pair of rods having their end zones secured to the side walls of the frame, a tubular filter element formed of mineral fibers having a closed end and an open end, said filter element having a portion retroflexed upon itself to position the closed end adjacent the open end, the wall portions of the filter element defining the open end being secured to the walls of the rectangular opening in the frame, each of said rods having portions disposed longitudinally and coextensively with the filter element and supporting said element, each of said rods having a transversely extending portion adjacent the closed end of the filter element, said transversely extending portions of the rods being in crossed relation and engaging the closed end zone of the filter element forming a plurality of triangularly shaped entrance zones at the open end of the filter element.

References Cited in the file of this patent

UNITED STATES PATENTS

| 1,821,202 | Birkholz | Sept. 1, 1931 |
| 2,091,137 | Carson | Aug. 24, 1937 |
| 2,100,374 | Biever | Nov. 30, 1937 |
| 2,167,236 | Gieseler | July 25, 1939 |
| 2,225,389 | Osterdahl | Dec. 17, 1940 |
| 2,251,964 | Stackhouse | Aug. 12, 1941 |
| 2,409,078 | Swann | Oct. 8, 1946 |
| 2,610,702 | Thornwald | Sept. 16, 1952 |
| 2,621,757 | Anderson | Dec. 16, 1952 |

FOREIGN PATENTS

| 20,176 | Great Britain | Sept. 4, 1912 |
| 116,716 | Australia | Mar. 12, 1943 |
| 414,035 | Great Britain | July 20, 1934 |
| 575,846 | France | Apr. 30, 1924 |